Figure 1:
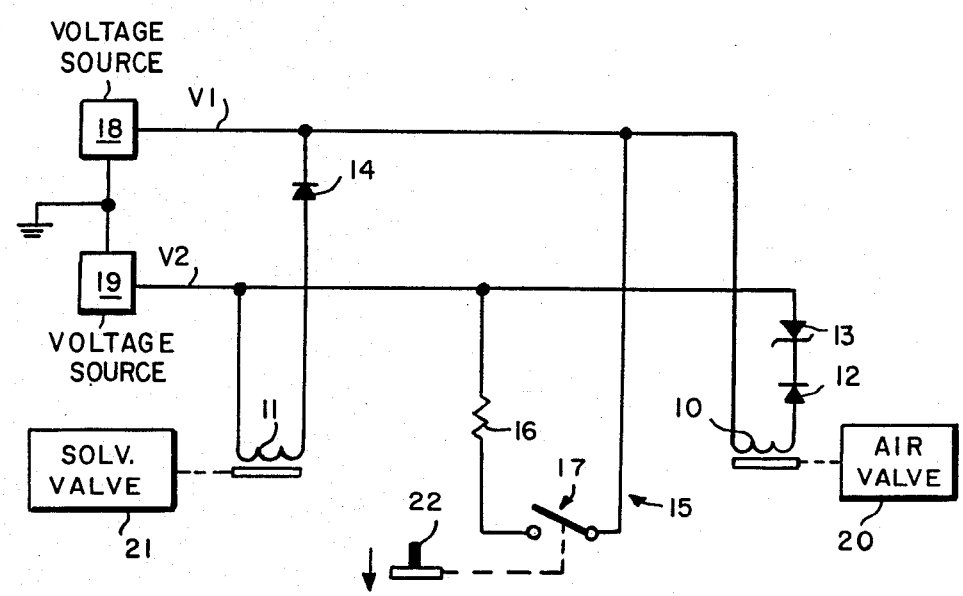

United States Patent [19]

Norcross, Jr.

[11] Patent Number: 4,800,290

[45] Date of Patent: Jan. 24, 1989

[54] CONTROL CIRCUITRY

[75] Inventor: Robert A. Norcross, Jr., Newton, Mass.

[73] Assignee: Norcross Corporation, Newton, Mass.

[21] Appl. No.: 123,321

[22] Filed: Nov. 18, 1987

[51] Int. Cl.⁴ ............................................. H02H 3/28
[52] U.S. Cl. ...................................... 307/43; 307/64; 307/66
[58] Field of Search ................................... 307/34–46, 307/85, 86, 87, 64, 66; 361/187, 191; 137/87, 88, 92, 101.19, 822, 823, 824, 832, 838

[56] References Cited

U.S. PATENT DOCUMENTS 3,942,028 3/1976 Baker .................................... 307/66
3,949,238 4/1976 Brookes ................................ 307/64

Primary Examiner—William M. Shoop, Jr.
Assistant Examiner—Paul Ip
Attorney, Agent, or Firm—Robert F. O'Connell

[57] ABSTRACT

Control circuitry utilizing first and second voltage sources and first and second circuits across such sources, one circuit having a first energizable element in series with a first diode arrangement and the other circuit having a second energizable element in series with a second diode arrangement. If the voltage difference from the sources is greater than a first value the first diode arrangement is conductive and the energizable element is energized, while if such voltage difference is less than a second value this second diode arrangement is conductive and the second energizable element is energized.

7 Claims, 1 Drawing Sheet

CONTROL CIRCUITRY

INTRODUCTION

This invention relates generally to electrical control circuitry and, more particularly, to relatively simple and low-cost circuitry for controlling energizing means, such as solenoid coils, so as to control the actuation of valves and the monitoring of limit switches in a desired manner.

BACKGROUND OF THE INVENTION

Control circuits have been used for many years in controlling the actuation of valves. Particular circuitry has been used in viscosity measuring devices, for example, particularly of the moving piston type wherein a piston moves, either by freely falling, or by being driven, from a first or beginning position within a liquid whose viscosity is to be measured, to a second or end position, the time of such movement between the beginning and end positions being proportional to the viscosity of the liquid.

Such devices can be used, for example, to monitor in a generally continual manner the viscosity of a liquid so as to maintain such viscosity within acceptable limits. In such monitoring context, control circuitry is used to actuate an air valve, a liquid flow valve, or other means, for raising a piston therein to its known first position within a liquid sample. The piston is then permitted to fall freely, or is otherwise driven to move, within the liquid until it reaches a known second position, at which time it actuates a limit switch to permit a measurement of the time of such movement, the time then representing a measure of the viscosity. So long as the piston reaches its end position in a time period within an acceptable range, the viscosity is within the desired limits. The monitoring device continues to monitor the viscosity on a cyclical basis.

If, however, the viscosity becomes too high, the piston will not reach its end position within the desired time range and it is necessary to actuate a further valve for supplying solvent to the liquid so as to reduce its viscosity. On the other hand, if the viscosity is too low, the piston reaches its end position too quickly and it is necessary to actuate a valve for supplying a thickener to the liquid to increase its viscosity.

The control of the operation of the valves and the monitoring of the actuation of a limiter switch has up to this time required the use of relatively complex circuitry and electro-mechanical assemblies which ar relatively costly to fabricate.

It is desirable to perform the desired operations for controlling such viscosity measuring device in a simpler manner, using fewer components, and accordingly permitting such circuitry and assemblies to be fabricated at much less cost.

BRIEF SUMMARY OF THE INVENTION

A preferred embodiment of the circuitry of the invention includes a first circuit comprising a first solenoid coil for actuating a first valve, e.g., to supply air to the system, as mentioned above, and a second circuit comprising a second solenoid coil for actuating a second valve, e.g., to supply solvent or thickener to the system. Appropriate diode arrangements are connected in series with each coil in such circuits, the circuits each being connected across a pair of voltage sources V1 and V2 which supply first and second voltages thereto.

A third current-monitoring circuit comprises a resistance and a limit switch in series across the voltage sources, the switch being actuated by the freely falling or driven piston of a viscosity measuring device, for example, when the piston reaches its end limit, or position.

The voltages are controlled so that the value of the voltage difference (V1−V2) controls the operation of the circuits involved. Thus, when the difference voltage is greater than a first value the diode arrangement associated with the first solenoid coil is placed in a conductive state and the first solenoid coil is energized so as to actuate the air or flow valve. When the voltage difference (V1−V2) is less than a second level the diode arrangement associate with the second solenoid coil is placed in a conductive state and the second coil is energized to actuate the solvent or thickener valve. When the voltage difference is less than the first level but greater than the second level, the current monitoring circuitry produces a current when the switch is closed for indicating the time of closure thereof.

The control circuitry has relatively few components and can be readily assembled at low cost.

DESCRIPTION OF THE INVENTION

Figure 2:
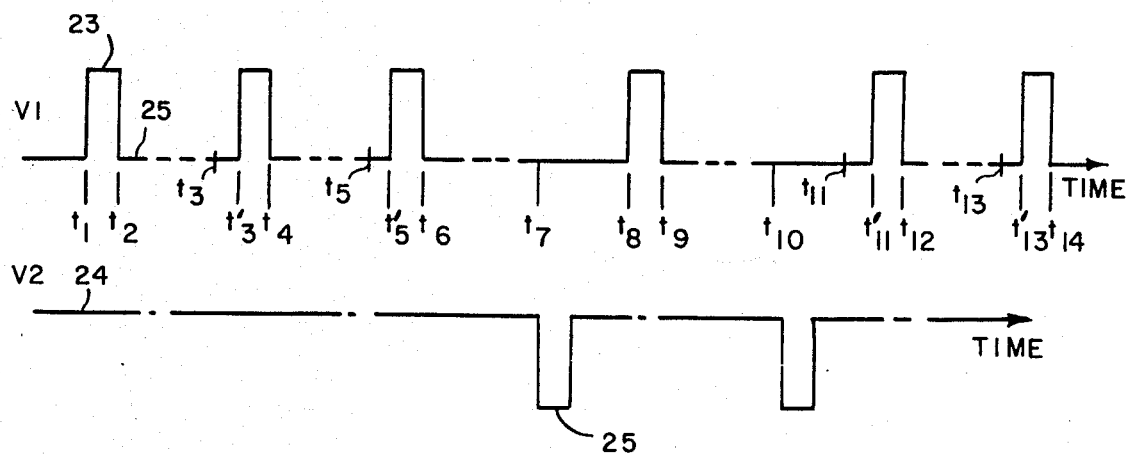

The invention can be described in more detail with the help of the accompanying drawings wherein:

FIG. 1 shows a preferred embodiment of control circuitry in accordance with the invention; and FIG. 2 shows a typical timing diagram of the voltages used in the circuitry of FIG. 1.

As can be seen in the particular embodiment of FIG. 1, the control circuitry of the invention will be explained as being used, for example, to add solvent when the viscosity becomes too high. It can also be designed to include circuitry (not shown) for adding thickener when the viscosity becomes too low. The control circuitry includes a first solenoid coil 10 which is used to actuate an air valve 20. Coil 10 is arranged to be in series with a conventional diode 12 and a Zener diode 13, the overall series arrangement being connected across a pair of voltage sources 18 and 19. Voltage source 18 supplies a first voltage V1 and voltage source 19 supplies a second voltage V2. Accordingly, the voltage across the series arrangement of coil 10 and diodes 12 and 13 is (V1−V2).

A second circuit comprises a solenoid coil !1 which is used to actuate a solvent valve 21. Coil 11 is arranged in series with a conventional diode 14, the overall series circuit being connected across voltage sources 18 and 19 in the manner shown.

A current limiting circuit 15 comprises a series arrangement of resistor 16 and limit switch 17, such series arrangement also being connected across the voltage sources 18 and 19 as shown. Switch 17 is actuated when a piston element 22 reaches a preselected end position within a viscous liquid, the viscosity of which is to be measured, the piston free falling or being driven through the liquid as shown by the arrow.

When the voltage difference (V1−V2) is greater than a value which equals the sum of the forward bias voltage of diode 12 and the breakdown voltage of Zener diode 13, coil 10 will be energized. Such energization will cause air valve 20 to be actuated so as to move piston 22 to its beginning position within the viscous liquid.

When the voltage difference (V1−V2) is less than a second value, which causes diode 14 to become conductive, coil 11 will be energized. Such energization will actuate the solvent valve 21 so as to supply solvent to the viscous liquid.

When (V1−V2) is below the first value and above the second value neither coil is energized. Such condition occurs when the piston is free-falling or is being driven through the viscous liquid to its end position therein, at which point limit switch 17 is activated by the moving piston. At such point, the value of (V1−V2) is such that a current flows in current monitoring loop 15 and the presence of such current can be appropriately monitored to provide an indication of the time at which the actuation of switch 17 occurs, i.e., the time of arrival of piston 22 at its end point. Accordingly, a measurement of the viscosity is provided, which measurement is proportional to the time of the piston's free fall or driven movement from its beginning to end positions.

The presence of resistor 16 prevents a short circuit occurring across the voltage sources when either coil 10 or coil 11 is energized and switch 17 is closed.

In operating the circuit so as to control the viscosity of the viscous liquid which is being monitored, an appropriate processor can be used to provide a program for producing the desired relationship between the voltages V1 and V2 so as to cause the desired operation, as can be shown, for example, with respect to the timing diagram of FIG. 2. At $t_1$, voltage V1 is supplied at a first level 23, voltage V2 being supplied at a second level 24, the difference (V1−V2) being such as to cause coil 10 to be energized as discussed above. Energization thereof for a time period ($t_2-t_1$) will cause the piston 22 to be raised to its beginning position within the liquid whose viscosity is being monitored. At $t_2$, the level of V1 drops to the value 25, the difference voltage (V1−V2) being such as to stop the energization of coil 10 so that the piston can freely fall or be driven within the viscous liquid over the time period from $t_2$ to $t_3$. At time $t_3$ the limit switch 17 is closed when the piston has reached its preselected end position, thereby providing an indication that the viscosity is at a particular level. If the time period from $t_2$ to $t_3$ is within a selected range, the viscosity is within the desired level.

If the viscosity is satisfactory, at time $t_3$, after a slight delay, e.g., two seconds, following $t_3$, the voltage V1 is raised to the value 23 so that the difference voltage again provides the same operation with respect to the energization of coil 10 and valve 20 so as to begin the viscosity measuring cycle once more in the manner as shown in the time frame from $t'_3$ to $t_5$. During the next cycle ($t_5'$ to $t_7$) if the viscosity of the liquid being monitored is too high and is outside the desired range limits for the particular application in which the liquid is being used, the switch 17 will not be actuated by the desired time $t_7$ so that no current will flow in current limiting circuit 15 by time $t_7$, thereby indicating that the viscosity level is too high.

In order to reduce the viscosity level, solvent is introduced into the viscous liquid by providing at or shortly after $t_7$ a voltage level 25 of the voltage V2 so that the voltage difference (V1−V2) is such as to energize coil 11 as discussed above. Such energization actuates solenoid valve 21 to introduce more solvent into the viscous liquid so as to reduce its viscosity even further. When the viscosity is reduced to a level within the desired range, the monitoring operation will continue, e.g., from $t_{11}$, as before in the same cyclic manner. Each time the viscosity is indicated as being too high, coil 11 is again actuated to introduce more solvent.

In a similar manner, an additional solenoid control circuit can be used to introduce thickener when the viscosity is too low and the limit switch is closed too quickly.

Thus, the control circuit shown in FIG. 1 permits the viscosity of a liquid, which is being used in a particular process, to be controlled so that the viscosity is kept within a desired range in such process.

While the circuitry shown and the operation thereof as described above represents a preferred embodiment of the invention, modifications thereof within the spirit and scope of the invention may occur to those in the art. Accordingly, the invention is not to be construed as limited to the specific embodiment described above, except as defined by the appended claims.

What is claimed is:

1. Control circuitry comprising:
   a first voltage source for supplying a first voltage V1;
   a second voltage source for supplying a second voltage V2;
   a first circuit comprising an energizable means and a first diode arrangement connected in series therewith across said first and second voltage sources;
   a second circuit comprising a second energizable means and a second diode arrangement connected in series therewith across said first and second voltage sources;
   said first and second voltages being arranged so that V1-V2 is greater than a first value, said first diode arrangement becomes conductive and said first energizable means is energized and, when V1−V2, is less than a second value, said second diode arrangement is conductive and said second energizable means is energized.

2. Control circuitry in accordance with claim 1 and further including:
   a current limiting circuit comprising a limit switch and an impedance means connected in series therewith across said first and second voltage sources so that when V1−V2 is less than said first value and is greater than said second value, a current flows through said current limiting circuit when said switch is closed.

3. Control circuitry in accordance with claim 2 wherein said first and second energizable means are solenoid coils.

4. Control circuitry in accordance with claim 3 wherein said first diode arrangement comprises a first diode and a Zener diode connected in series and said second diode arrangement includes a second diode.

5. Control circuitry in accordance with claim 4 wherein said impedance means is a resistor.

6. Control circuitry in accordance with claim 2 for use in a viscosity monitoring device and further including
   a movable piston means adapted to be moved from a beginning position to an end position within a liquid whose viscosity is to be measured;
   first actuation means responsive to the energizing of said first energizable means for positioning said piston means at said beginning position;
   said limit switch being responsive to said piston means so as to close when said piston means reaches its said end position within said viscous liquid, thereby completing said current limiting circuit so as to produce a current therethrough; and second actuation means for introducing a material into said viscous liquid in response to the energization of said second energizable means.

7. A control circuitry in accordance with claim 6 wherein said second actuation means introduces a solvent into said viscous liquid if said limit switch is not closed within a specified time period.

* * * * *